B. A. ELLIOTT.
AUTOMATICALLY OPERATED STOCK FEEDER.
APPLICATION FILED NOV. 27, 1911.
1,022,309.
Patented Apr. 2, 1912.
2 SHEETS—SHEET 1.
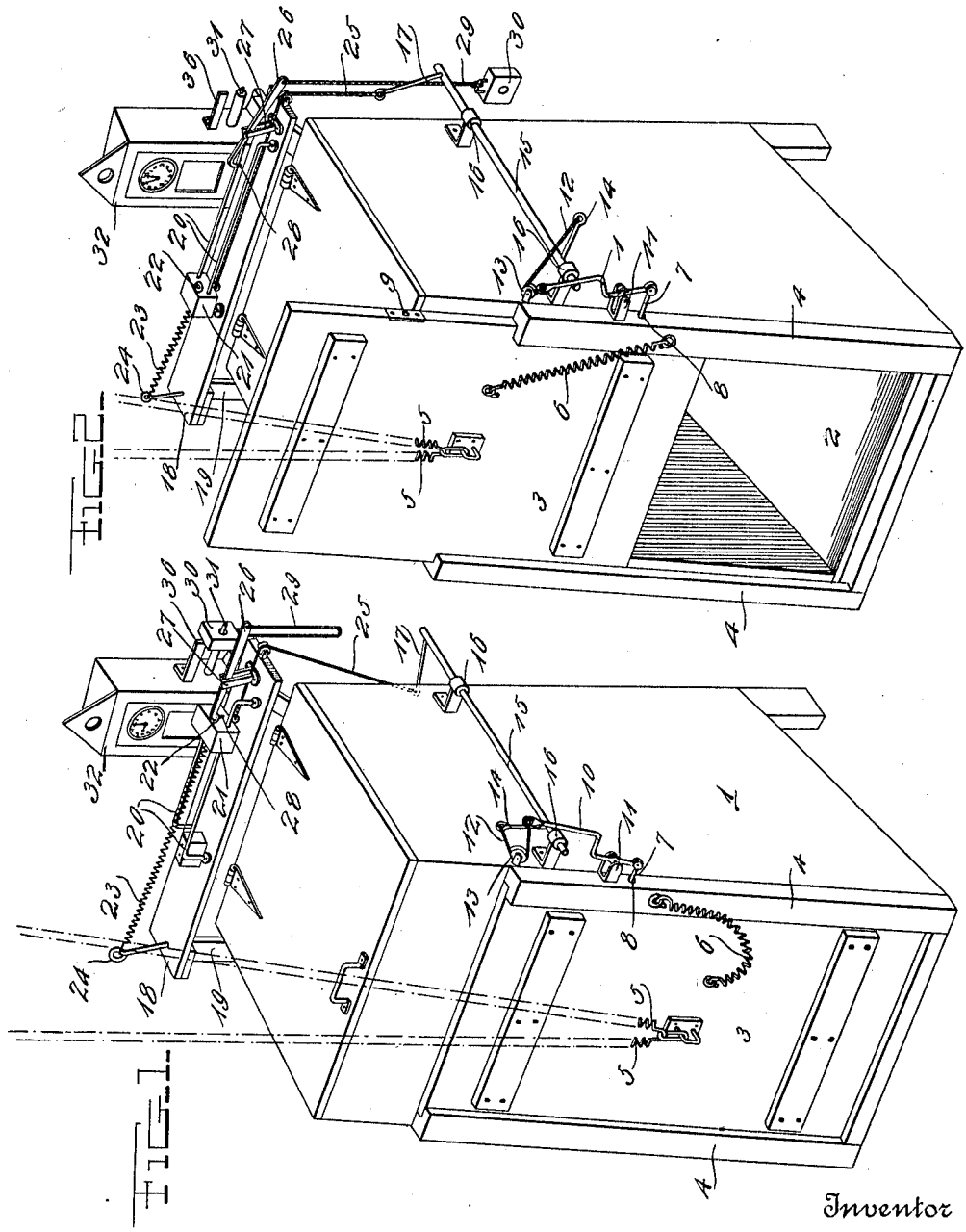

B. A. ELLIOTT.
AUTOMATICALLY OPERATED STOCK FEEDER.
APPLICATION FILED NOV. 27, 1911.
1,022,309.
Patented Apr. 2, 1912.
2 SHEETS—SHEET 2.
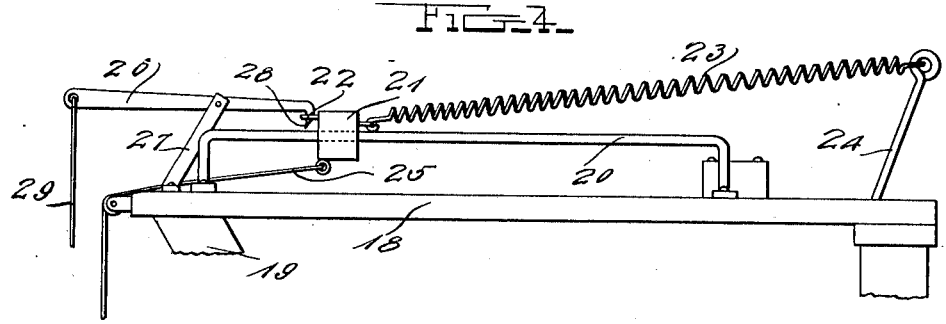
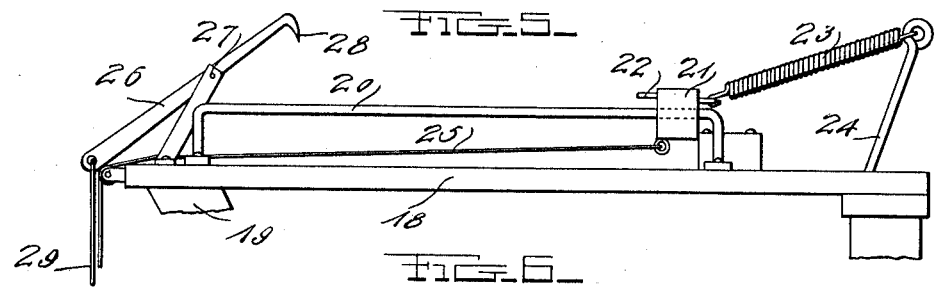
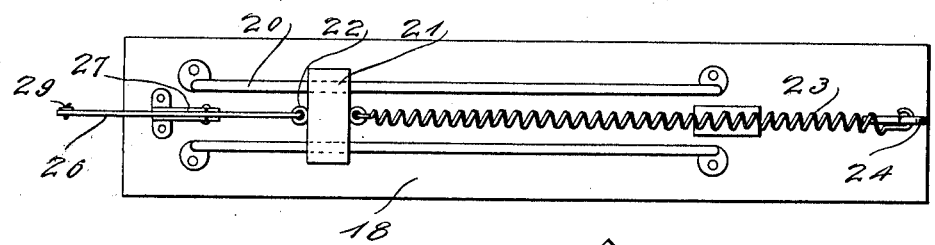
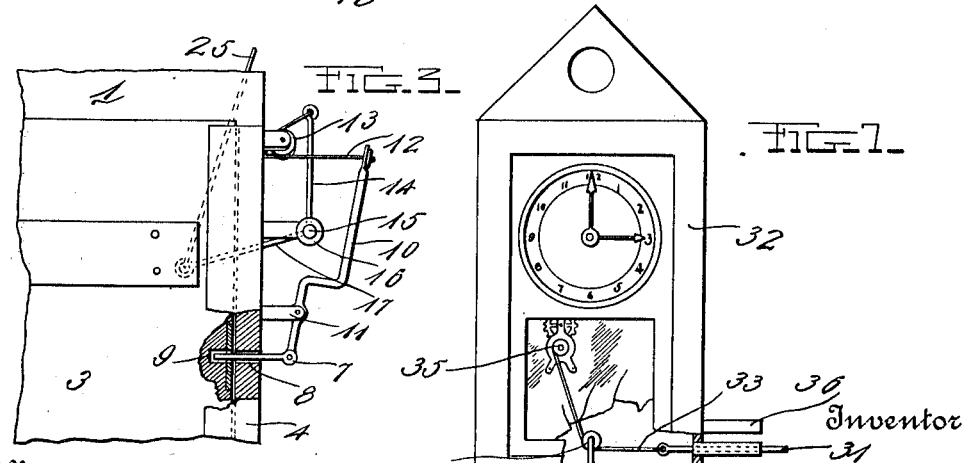
Witnesses
J. R. Pierce
C. E. Hunt
Inventor
B. A. Elliott
by H. B. Willson & Co.
Attorneys
COLUMBIA PLANOGRAPH CO., WASHINGTON, D. C.

UNITED STATES PATENT OFFICE.

BURTON A. ELLIOTT, OF CASS CITY, MICHIGAN.

AUTOMATICALLY-OPERATED STOCK-FEEDER.

1,022,309.  Specification of Letters Patent.  Patented Apr. 2, 1912.

Application filed November 27, 1911. Serial No. 662,737.

*To all whom it may concern:*

Be it known that I, BURTON A. ELLIOTT, a citizen of the United States, residing at Cass City, in the county of Tuscola and State of Michigan, have invented certain new and useful Improvements in Automatically-Operated Stock-Feeders; and I do declare the following to be a full, clear, and exact description of the invention, such as will enable others skilled in the art to which it appertains to make and use the same.

This invention relates to improvements in stock feeders.

One object of the invention is to provide a stock feeder having an improved construction and arrangement of automatic operating mechanism and means whereby said mechanism is automatically released at any desired time for discharging the contents of the feeder or for opening the same to permit the stock to have access to the feed therein.

With this and other objects in view, the invention consists of certain novel features of construction and the combination and arrangement of parts as will be more fully described and claimed.

In the accompanying drawings; Figure 1 is a perspective view of my stock feeder showing the same in closed position; Fig. 2 is a similar view showing the door of the feeder open; Fig. 3 is a front view of a portion of the feeder showing more clearly the construction and arrangement of the door fastening device and the releasing mechanism thereof; Fig. 4 is a front view of the operating mechanism for actuating the releasing mechanism for the door fastening devices showing the parts set or in position for operation; Fig. 5 is a similar view showing the parts after the same have been released; Fig. 6 is a plan view of the operating mechanism in the position shown in Fig. 4; Fig. 7 is a front view of a clock showing the mechanism for supporting and releasing the weight which trips the operating mechanism shown in Figs. 4, 5 and 6.

My improved feeder comprises a hopper 1 having a bottom 2 which inclines from the rear toward the front of the hopper and has in the front thereof a discharge opening which is adapted to be closed by a vertically sliding door 3 mounted in guides 4. Connected to the door are opening springs 5 the upper ends of which are secured to any suitable overhead structure whereby the tension thereof will be exerted to pull the door upwardly to an open position when the fastening device thereof is released. The upward movement of the door is limited to prevent the door from being pulled entirely out of the guides 4 by a stop spring 6 secured thereto and to the hopper as shown.

The door fastening device comprises a bolt 7 which is slidably mounted in the passage 8 in one of the guides 4 of the door and is adapted to be engaged with a recess 9 formed in the adjacent edge of the door when the latter is in a closed position thereby locking the door against the tension of the springs 5. The bolt 7 is pivotally connected at its outer end to a releasing lever 10 pivotally mounted in a bracket 11 secured to the adjacent side of the hopper as shown. The upper end of the lever 10 is bent outwardly or offset at right angles and to said offset upper end is connected an operating cord 12 which passes around a guide pulley 13 secured to the side of the hopper and has its opposite end connected with a crank arm 14 on the outer end of a rock shaft 15 which is mounted in suitable brackets 16 arranged on the side of the hopper and has on its rear or opposite end a crank arm 17 whereby the shaft is rocked by a suitable operating mechanism hereinafter described. When the shaft 15 is rocked in the proper direction the crank arm 14 will pull upon the cord 12 thus drawing the upper end of the lever 10 inwardly and causing the lower end of the lever to retract the bolt 7 out of engagement with the recess 9 in the door whereupon the spring 5 will pull the door upwardly to an open position.

The operating mechanism for the rock shaft 15 comprises a base plate or board 18 which is arranged on a suitable support 19 at the rear end of the shaft and on which is arranged a pair of guide rods 20, said rods being spaced a suitable distance above the board 18 as shown. Slidably mounted on the rods is a spring retracted block 21 having in one side a screw eye 22 and having connected to its opposite side a coiled retracting spring 23, said spring having its outer end connected to a post 24 on the rear end of the board 18. To the block 21 is also connected a cord or cable 25 the opposite end of which is connected to the crank arm 17 of the rock shaft whereby when said block is retracted on the rods 20 by the spring 23 the cord 25 will pull upwardly on the crank arm 17, thus rocking the shaft 15 and causing the crank arm on the opposite end thereof to actuate the releasing device of the door fastening bolt as hereinbefore described.

The block 21 is held in an operative position against the tension or pull of the spring 23 and at the forward ends of the guide rods 20 by a trigger 26 which is pivotally mounted in bearing bars 27 arranged on the adjacent end of the board 18 and has on its inner end a tooth or detent 28 which is adapted to be engaged with the screw eye 22 in the block 21 when the latter is in an operative position. To the outer end of the trigger 26 is connected a short weight supporting cord 29 to the outer end of which is secured a trigger releasing weight 30. The weight 30 is supported in an inoperative position upon an automatically operated releasing mechanism comprising a rod 31 which is slidably mounted in a suitable aperture formed in one side of a clock 32 and has connected to its inner end a retracting cord 33 which passes around a guide pulley 34 secured to the bottom of the clock and has its opposite end attached to and adapted to be wound on the winding shaft 35 of the alarm mechanism of the clock whereby when the alarm is set off and the shaft revolved the cord will be wound up on the shaft thus retracting or drawing the rod 31 inwardly. The weight 30 is provided with a suitable aperture adapted to receive the outer end of the rod 31 when the weight is arranged thereon and to the adjacent side of the clock is secured a weight releasing bar or block 36 the outer end of which is disposed adjacent to and in the path of movement of the weight when the latter is drawn toward the clock by the retracting or inward movement of the rod 31 whereupon when said rod is drawn into the clock by the cord 33 the block 36 will push the weight from off the end of the rod causing the weight to drop. When thus released the force of the falling weight is brought upon the outer end of the trigger 27 through the cord 29 thus rocking the trigger and disengaging the detent 28 on the inner end thereof from the screw eye 22 in the block 21 thus releasing the latter and permitting the spring 23 to jerk the block back on the guide rods 20 thus pulling upon the cord or cable 25 which operation will rock the shaft 15 and thereby actuate the releasing device of the door fastening bolt in the manner described.

By constructing the operating and releasing mechanism for the door fastening bolt as herein shown and described it will be seen that said mechanism may be released at any desired time by setting the alarm mechanism of the clock to go off at this time.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is;

1. A stock feeder comprising a hopper having therein a discharge opening, a door to close said opening, springs connected to said door whereby the latter is opened, a spring to limit the opening movement of the door, a door fastening bolt, a bolt releasing device said device comprising a suitably mounted lever connected at one end to the bolt, a suitably mounted rock shaft, a crank arm formed on one end thereof, a flexible connection between said bar and the free end of said bolt retracting lever whereby when the shaft is rocked the lever will be retracted, a crank arm on the opposite end of said rock shaft, an operating mechanism connected with the last mentioned crank arm whereby the shaft is rocked to actuate said bolt releasing mechanism, a trigger to hold said operating mechanism in a set or operative position, and an automatically operated trigger releasing mechanism connected with said trigger whereby the latter may be tripped to release the operating mechanism at any desired time.

2. In a stock feeder, a hopper having therein, a door opening, a spring operated door to close said opening, a fastening bolt to hold said door in closed position, a bolt retracting mechanism, a rock shaft operatively connected at one end to said retracting mechanism, a crank arm arranged on the opposite end of said shaft, a shaft operating mechanism comprising a slidably mounted block, a spring connected thereto, a cord to connect said block with the crank arm on said rock shaft whereby when the block is retracted by said spring the shaft will be rocked and said bolt retracting mechanism actuated to retract the door fastening bolt, a trigger adapted to be engaged with said block to hold the same in operative position against the pressure of said spring, and an automatically operated tripping mechanism adapted to release said trigger at any desired time.

3. In a stock feeder, a hopper having therein a door opening, a spring operated door to close said opening, a fastening bolt to hold said door in closed position, a bolt retracting mechanism, a rock shaft operatively connected at one end to said retracting mechanism, a crank arm arranged on the opposite end of said shaft, a shaft operating mechanism comprising a slidably mounted block, a spring connected thereto, a cord to connect said block with the crank arm on said rock shaft whereby when the block is retracted by said spring the shaft will be rocked and said bolt retracting mechanism actuated to retract the door fastening bolt, a trigger adapted to be engaged with said block to hold the same in operative position against the pressure of said spring, a weight connected with said trigger, a weight supporting rod adapted to hold the weight in an inoperative position, a block adapted to push said weight from the end of the rod when the latter is retracted whereby the force of the falling weight will release said trigger, and means whereby said rod is retracted and disengaged from said weight.

4. In a stock feeder, a hopper having therein a door opening, a spring operated door to close said opening, a fastening bolt to hold said door in closed position, a bolt retracting mechanism, a rock shaft operatively connected at one end to said retracting mechanism, a crank arm arranged on the opposite end of said shaft, a shaft operating mechanism comprising a slidably mounted block, a spring connected thereto, a cord to connect said block with the crank arm on said rock shaft whereby when the block is retracted by said spring the shaft will be rocked and said bolt retracting mechanism actuated to retract the door fastening bolt, a trigger adapted to be engaged with said block to hold the same in operative position against the pressure of said spring, a clock having arranged therein an alarm winding shaft, a slidably mounted weight supporting rod, a cord connected to one end of said rod and adapted to be wound on said alarm winding shaft whereby the rod is retracted, a weight adapted to be loosely engaged with one end of said rod and a flexible connection between said weight and said trigger, and a block adapted to engage said weight and hold the same when said rod is retracted thereby pushing the weight from the end of the rod whereupon the force of the weight will release the trigger.

In testimony whereof I have hereunto set my hand in presence of two subscribing witnesses.

BURTON A. ELLIOTT.

Witnesses:
D. C. ELLIOTT,
GEO E. PERKINS.

---

Copies of this patent may be obtained for five cents each, by addressing the "Commissioner of Patents, Washington, D. C."